US011412712B2

(12) United States Patent
Peper, Jr. et al.

(10) Patent No.: US 11,412,712 B2
(45) Date of Patent: Aug. 16, 2022

(54) ANIMAL-WEARABLE AUDIBLE COMMUNICATION APPARATUS

(71) Applicant: Command Sight, Inc., Seattle, WA (US)

(72) Inventors: Alan Robert Peper, Jr., Seattle, WA (US); Nenad Nestorovic, Seattle, WA (US)

(73) Assignee: COMMAND SIGHT, INC., Seattle, WA (US)

( * ) Notice: Subject to any disclaimer, the term of this patent is extended or adjusted under 35 U.S.C. 154(b) by 0 days.

(21) Appl. No.: 17/523,845

(22) Filed: Nov. 10, 2021

(65) Prior Publication Data

US 2022/0151206 A1    May 19, 2022

Related U.S. Application Data

(60) Provisional application No. 63/113,638, filed on Nov. 13, 2020.

(51) Int. Cl.
*A01K 27/00*    (2006.01)
*A01K 29/00*    (2006.01)

(52) U.S. Cl.
CPC ......... *A01K 27/009* (2013.01); *A01K 27/001* (2013.01); *A01K 29/005* (2013.01)

(58) Field of Classification Search
CPC .... A01K 27/001; A01K 29/005; A01K 15/02; A01K 15/021; A01K 27/002; A01K 27/009; H04R 1/1075; H04R 1/40; H04R 2201/023
See application file for complete search history.

(56) References Cited

U.S. PATENT DOCUMENTS

| | | | | |
|---|---|---|---|---|
| 4,335,682 A | * | 6/1982 | Gonda | A01K 15/021 119/908 |
| 5,815,077 A | * | 9/1998 | Christiansen | A01K 15/021 455/100 |
| 6,052,097 A | * | 4/2000 | Duncan | H01Q 1/273 343/788 |

(Continued)

FOREIGN PATENT DOCUMENTS

CN        106954154 B    2/2020

OTHER PUBLICATIONS

International Search Report and Written Opinion of the International Searching Authority in PCT/US2021/059250, dated Feb. 2, 2022.

*Primary Examiner* — Trinh T Nguyen
(74) *Attorney, Agent, or Firm* — Perkins Coie LLP

(57) ABSTRACT

An apparatus for enabling audible communication between an animal and a remote handler of the animal comprises a flexible strap configured to be worn by the animal, and a bone conduction transducer coupled to the flexible strap and capable of receiving a signal representing a message from the remote handler. The bone conduction transducer is configured to generate physical vibrations based on and representative of the signal representing the message from the remote handler. The bone conduction transducer is positioned or positionable on the flexible strap so that when the flexible strap is worn by the animal, the vibrations are conducted to a skeletal structure of the animal to enable the animal to audibly perceive the message from the remote handler.

21 Claims, 8 Drawing Sheets

(56) References Cited

U.S. PATENT DOCUMENTS

| | | | |
|---|---|---|---|
| 10,440,938 B2 * | 10/2019 | Menkes | A01K 29/005 |
| 2002/0152970 A1 | 10/2002 | Takeda | |
| 2013/0030242 A1 | 1/2013 | Ruehring | |
| 2014/0247951 A1 | 9/2014 | Malaviya | |
| 2015/0373951 A1 * | 12/2015 | Kelly | A01K 29/005 |
| | | | 340/573.3 |
| 2016/0021506 A1 * | 1/2016 | Bonge, Jr. | A01K 27/006 |
| | | | 717/173 |
| 2017/0164580 A1 * | 6/2017 | Rettedal | G06F 3/04847 |
| 2018/0132450 A1 * | 5/2018 | Goetzl | A01K 15/021 |
| 2018/0153137 A1 * | 6/2018 | Goetzl | A01K 29/005 |
| 2020/0267936 A1 * | 8/2020 | Tran | A01K 29/005 |
| 2020/0267941 A1 * | 8/2020 | Seltzer | A01K 15/022 |
| 2020/0323285 A1 | 10/2020 | Longinotti-Buitoni et al. | |
| 2021/0114862 A1 * | 4/2021 | Crouthamel | B68B 5/06 |

* cited by examiner ical-terrorism operations, bomb search/
ANIMAL-WEARABLE AUDIBLE COMMUNICATION APPARATUS This application claims the benefit of U.S. Provisional patent application No. 63/113,638, filed on Nov. 13, 2020, and titled, "Animal Wearable Audio and Haptic Amplification System," which is incorporated by reference herein in its entirety.

FIELD OF THE INVENTION

At least one embodiment of the present invention pertains to facilitating communication between a human and an animal, and more particularly, to an animal-wearable audible communication apparatus.

BACKGROUND

Humans have long employed animals, particularly dogs, in various work roles. Because dogs have an acute sense of hearing compared to humans, audible commands are often the best way for a human handler to interact with a working dog or pet. However, there are many environments in which it is impractical or dangerous fora human handler to be within their working dog's normal hearing distance, such as military combat, anti-terrorism operations, bomb search/identification, post-disaster search and rescue operations, etc.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1A:
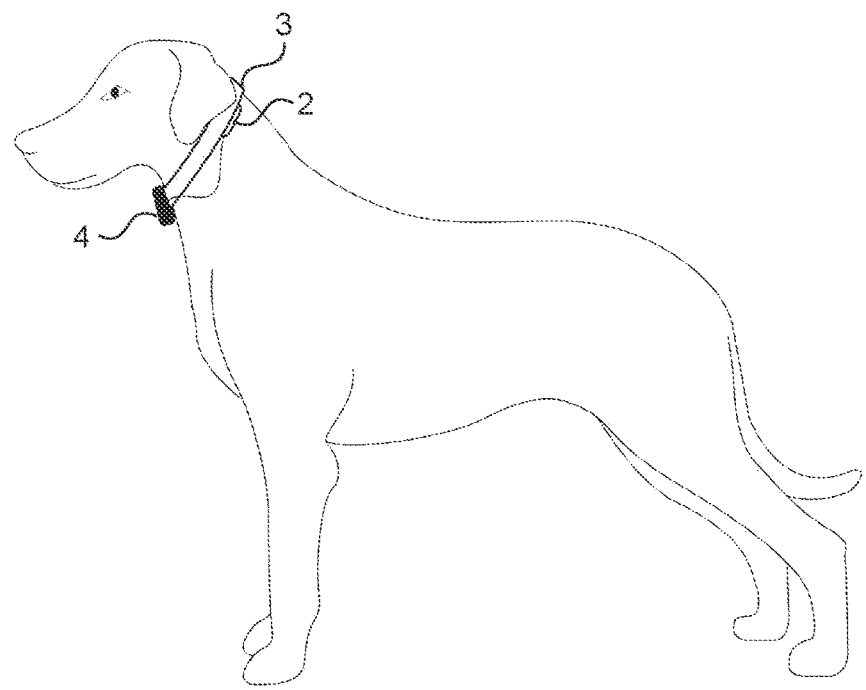
FIG. 1A illustrates a side view of a dog wearing an audible communication system that includes two transducers mounted to a collar.
Figure 1B:
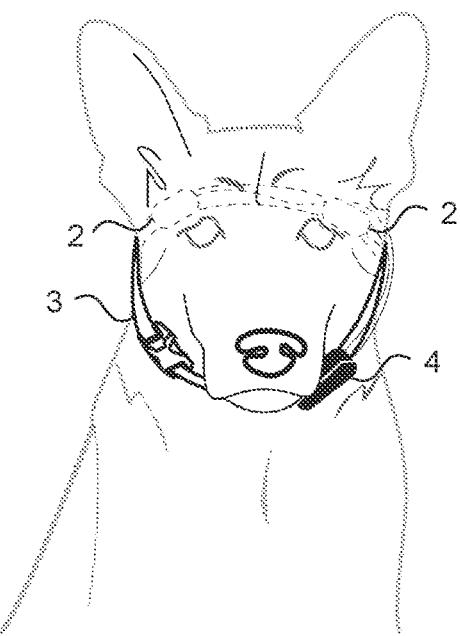
FIG. 1B illustrates a front view of a dog wearing an audible communication system that includes two transducers mounted to a collar.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

As described in detail below, introduced herein is an apparatus for enabling audible communication between an animal and a remote handler of the animal. In certain embodiments the apparatus comprises a flexible strap configured to be worn by the animal, and a bone conduction transducer coupled to the flexible strap and capable of receiving a signal representing a message from the remote handler. The bone conduction transducer is configured to generate physical vibrations based on and representative of the signal representing the message from the remote handler. The bone conduction transducer is positioned or positionable on the flexible strap so that when the flexible strap is worn by the animal, the vibrations are conducted to a skeletal structure of the animal to enable the animal to audibly perceive the message from the remote handler.

Although this disclosure focuses on dogs as examples of animals to which the techniques disclosed herein can be applied, it should be recognized that the disclosed techniques are also potentially applicable to other (non-human) animal species, such as dolphins and/or other sea mammals, primates, etc. Additionally, while this disclosure focuses on the application to working animals, the system and techniques disclosed herein could also be used as an audio amplification device for hearing impaired animals.

Bone conduction systems for humans are known and are aimed primarily at human-worn audio and home theater and ambient environmental use. The development of human-worn bone conduction audio systems was primarily derived from the ability of bone conduction systems to utilize the human head as a surface to conduct audio waves directly into the inner ear, bypassing the eardrum. This design enables the opening of the ear canal to remain open to other ambient sounds, such as a police siren, such that the wearer can enjoy the audio from an item such as a phone, and still retain situational awareness.

To maximize conduction, these systems primarily have their transducers placed directly onto the person's jawbone, before the opening of the outer ear. The transducers are mounted and connect via a mounting mechanism that wraps around the ear and headband, in order for the transducers to remain in the correct mounting area.

Other personal bone conduction systems have also been developed, where commercial off-the-shelf (COTS) transducers are mounted to hard surfaces, such as a bicycle helmet, utilizing the hard surface of the helmet to amplify the desired sound.

The other main use for audio transducers is for home theater or ambient environment use. These transducers can be mounted to hard surfaces such as on or inside walls as well as directly in furniture. The goal for these systems is to use the environmental object (e.g., walls) to amplify sound, and in the case of furniture mounts, to improve the listener's experience of an acoustical performance directly to the person(s) in direct contact with the furniture.

While these systems generally work well for human-worn form factors, they would not work well for applications involving animals. Animals, particularly dogs, have worn traditional speakers (vibrating air and moving the vibrations through to the eardrum) to enable people to interact with them, especially when operating in remote and non-Line-of-Sight (non-LOS) conditions. However, these traditional speakers have many shortcomings. To deliver an audio signal and ultimately sound to a dog, with fidelity that closely resembles that of the sound produced by the original source (i.e., the handler), a sufficiently large woofer, magnet and amplifier would be needed. This requirement creates untenable weight restrictions and power requirements to mount effectively on a dog. Additionally, any attempt to implement realistic spatial audio would therefore require an array of prohibitively large and bulky speakers. Consequently, traditional speaker systems mounted to the animal create a gap for the animal in the audio or vocal quality they would experience with animal-mounted speakers compared to if they were in audible range of the handler.

Another significant challenge relates to the use of a traditional speaker type system for applications where stealth is important for a dog and handler. Traditional speaker systems vibrate the air such that anyone in range of the speaker can hear the audio command being delivered. Thus, if a discrete command is given to the animal or dog, potentially anyone could intercept that audio command given that it is generally being broadcasted acoustically. Additionally, in an environment where the ambient environment is saturated with noise, or where the opening to the dog's ear is covered with ear protection and desired audio cannot be transmitted traditionally via a speaker or even through human-born voice through the ear drum, other methods for conducting audio are required.

Bone conduction enables audio to be delivered to an animal covertly by amplifying the sound such that is can be best heard only by the animal wearer, through the animal's own bone. Additionally, when the environmental conditions are saturated with noise, such as in an environment with explosions, bone conduction audio would not need to compete with the cacophony of the environment, rather it would provide an ability to deliver audio directly to the animal. Further, in a case where a handler may choose to abate ambient noise for the animal by applying wearable hearing protection to the animal, bone conduction provides a compelling option to communicate with the animal audibly, while maintaining hearing protection.

Spatial audio is another aspect that can be addressed with an array of bone conduction speakers and is not something that is currently addressed by currently available systems that rely on two transducers. With the technique introduced herein, one can more readily replicate spatial audio by placing an array of transducers on the animal. And, by doing so one can send audio signals to specific transducers to maximize spatial audio and awareness. For example, if an animal is in an open room with multiple doors, in order to send a dog to a specific room it would be necessary to provide commands to the animal to alter its focus to the door the handler is desiring it to enter. However, with spatial audio implemented by an array of transducers, rather than attempting to direct the animal's attention to a desired door the handler can simply give the animal a command to "come," with the spatial audio presenting the effect of the audio coming from the door/area the handler chooses.

However, to date, bone conduction technology is not known to have been applied to animals. Moreover, current mounting systems for human-worn bone conduction take into consideration only human morphology, not animal morphology. Thus, commercially available systems cannot be securely mounted to the animal in order to reap the benefits of bone conduction, nor are these systems designed to take advantage of the specific physiological characteristics of animals. Thus, without a way to securely mount transducers to an animal and without knowledge of animal-based physiology, human-worn form factors of bone conduction systems are not usable for animal worn applications.

The animal-wearable audible communication system introduced here ("the system") overcomes the above-mentioned problems. The system can be collar-mounted or head-harness mounted, at least in part. This method allows the handler to adjust the system modularly to a wide variety of animals, particularly (though not exclusively) dogs of many sizes. Moreover, a collar or head harness mount places the bone conduction units in close proximity to the animal's inner ear, whereby vibrations can be amplified directly from the base of the skull and proximal areas such as the cervical spine and occipital bone.

By mounting bone conduction transducers to the animal in this manner, several additional techniques to address canine morphology can be employed to maximize conductance. First, while designs of human-worn systems are heavily influenced by aesthetic concerns, and typically with just two transducers, in the case of animal worn systems multiple transducers can be mounted onto a collar or head harness in the most effective manner to maximize amplification to the animal. Second, mounting plates can be secured directly to the transducer and are designed to specifically align to related animal (e.g., canine) physiology to maximize contact with bony areas of the animal, and therefore maximize amplification of sound to the animal. Third, human-worn bone conduction systems are designed to be static in their placement, and are successful given that they are designed for generally normalized human physiology. In contrast, an the case of animals, there are significant physical differences between even the smallest and largest breed of dog, requiring the customization/optimization not only of the mounting plates that contact the bony parts of the dog, but also the location of where the transducers are mounted to the collar. Thus, the system introduced here allows a person (e.g., a handler) to manually adjust the location of one or more bone conduction transducers all along the length of a dog collar or head harness, thus enabling ideal fit for each animal wearing the system.

In at least some embodiments each bone conduction transducer is held within a two-piece 3D-printed housing (made of, e.g., black acrylic or ceramic). A first portion of the housing is carved out to allow the transducer to be placed within it in an inset fashion. A second portion of the housing is a mostly flat conduction plate (can be slightly concave or bent to accommodate the target animal's morphology) that is screwed to the bottom of the transducer in order to maximize audio conduction from the transducer to the skeletal structure of the animal. The plate may be manufactured in multiple sizes to accommodate a variety of individual animals, breeds and/or species.

In some embodiments, each transducer is mounted in a fixed location on a dog collar or head harness. All peripherals, such as signal amplification, power supply and wireless transceiver can be mounted (e.g., by clip-on or in a special pocket) on the collar, head harness, or in a vest or other similar garment worn by the dog, or a combination thereof.

In at least some embodiments, the transducer assemblies (i.e., the housing and transducer contained therein) are fixedly mounted on a collar or head harness. In other embodiments, one or more of the transducer assemblies have adjustable mounting to the collar or head harness, such that a handler can adjust the location of the transducer assembly and locket in place. Further, the transducers may be mounted parallel or perpendicular to each other on their respective sides, or at other angles relative to each other. In some embodiments, electrically conductive wiring is woven through the fabric of a custom collar or head harness to assist in power distribution to the transducers.

Figure 1C:
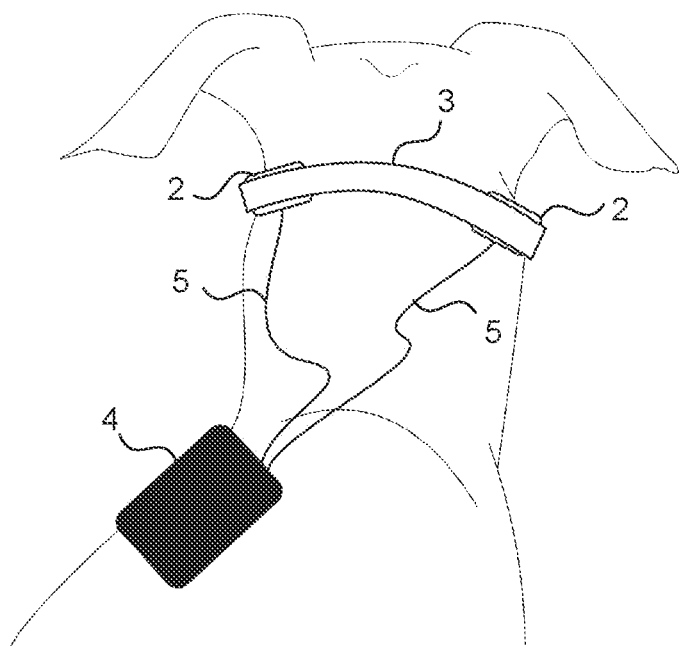
FIG. 1C illustrates a rear view of a dog wearing an audible communication system that includes two transducers mounted to a collar.

Example embodiments of the system are now further described with reference to the figures. FIGS. 1A through 1D relate to a first embodiment of the system, for a dog. The system 1 in the first embodiment includes two bone conduction transducer assemblies 2 (though only one is visible in FIG. 1A), each coupled to a collar 3 worn by a dog. Each bone conduction transducer assembly 2 includes a bone conduction transducer and a housing (not shown). The bone conduction transducer assemblies 2 are located, or are adjustably locatable, so as to lay on the dog's head just behind each ear. One or more peripheral devices, such as a wireless receiver/decoder (hereinafter called simply "wireless receiver" for conciseness) and/or a power supply, are housed within a peripheral unit 4, which is also mounted to the collar 3, or alternatively, to a vest or other garment (not shown) worn by the dog. FIG. 1C illustrates a rear view of an embodiment in which the peripheral unit 4 is mounted on a vest or other garment (not shown) on the dog's back.

Figure 1D:
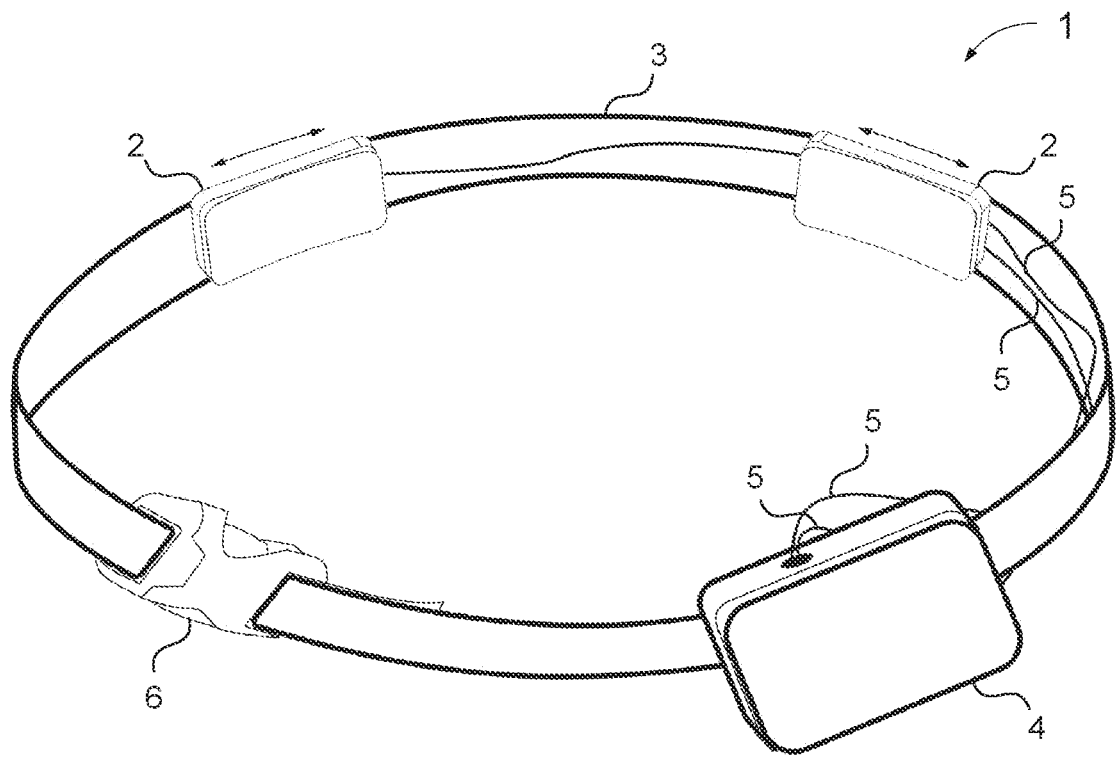
FIG. 1D illustrates a perspective view of an audible communication system fora dog, including two transducers mounted to a collar.

FIG. 1D illustrates a perspective view of just the system 1 according to the first embodiment. As shown, each transducer assembly 2 is coupled to the collar 3 (e.g., a flexible strap) and is connected by conductive wires 5 to receive audio signal input from a wireless receiver unit and to receive power from a power supply, both of which are housed within a peripheral unit 4. The conductive wires 5 may be flexible so as to be adjustable in length. The flexibility may be achieved, for example, by using wires with a helical configuration. A standard mechanical connector 6 can be unlatched to allow the collar to be easily and securely placed on or removed from the dog.

Figure 2A:
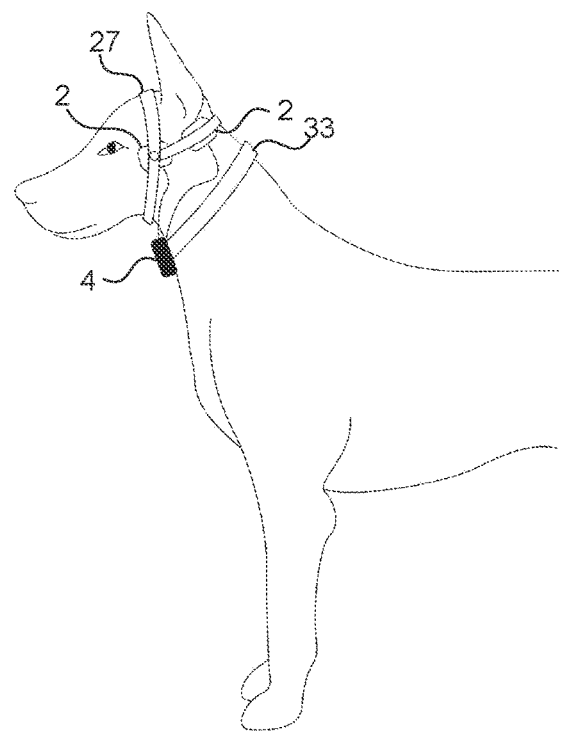
FIG. 2A illustrates a side view of a dog wearing an audible communication system that includes four transducers mounted to a head harness.
Figure 2B:
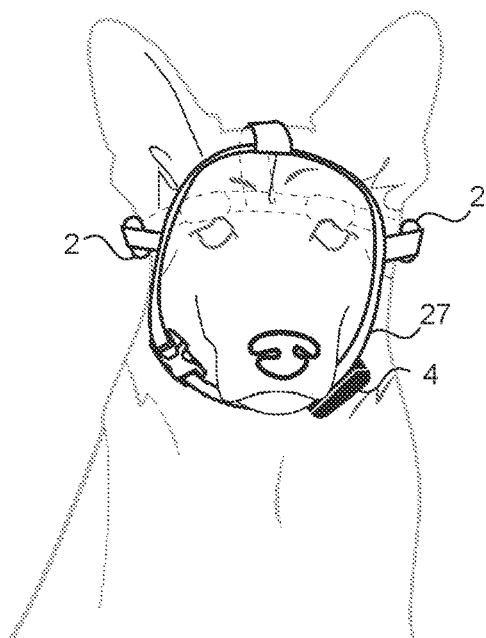
FIG. 2B illustrates a front view of a dog wearing an audible communication system that includes four transducers mounted to a head harness.
Figure 3A:
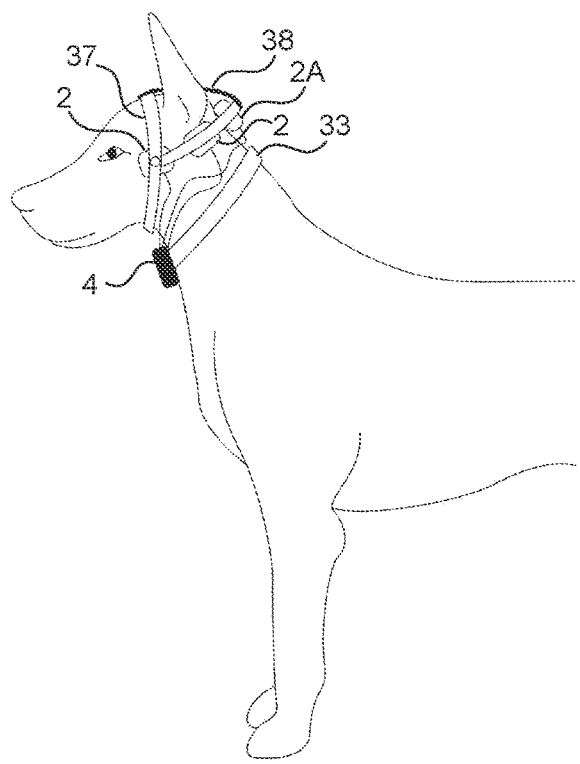
FIG. 3A illustrates a side view of a dog wearing an audible communication system that includes five transducers mounted to a head harness.
Figure 3B:
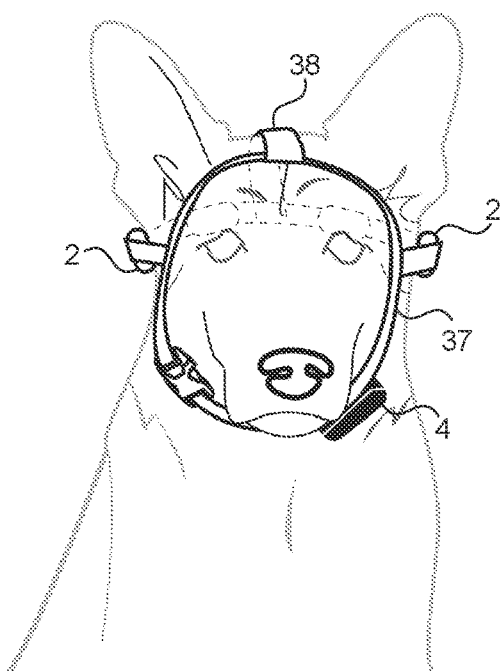
FIG. 3B illustrates a front view of a dog wearing an audible communication system that includes five transducers mounted to a head harness.
Figure 3C:
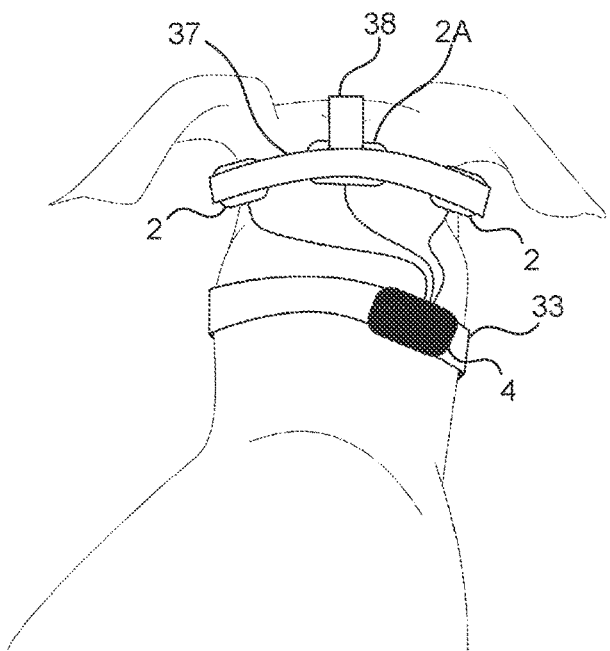
FIG. 3C illustrates a rear view of a dog wearing an audible communication system that includes five transducers mounted to a head harness.
Figure 3D:
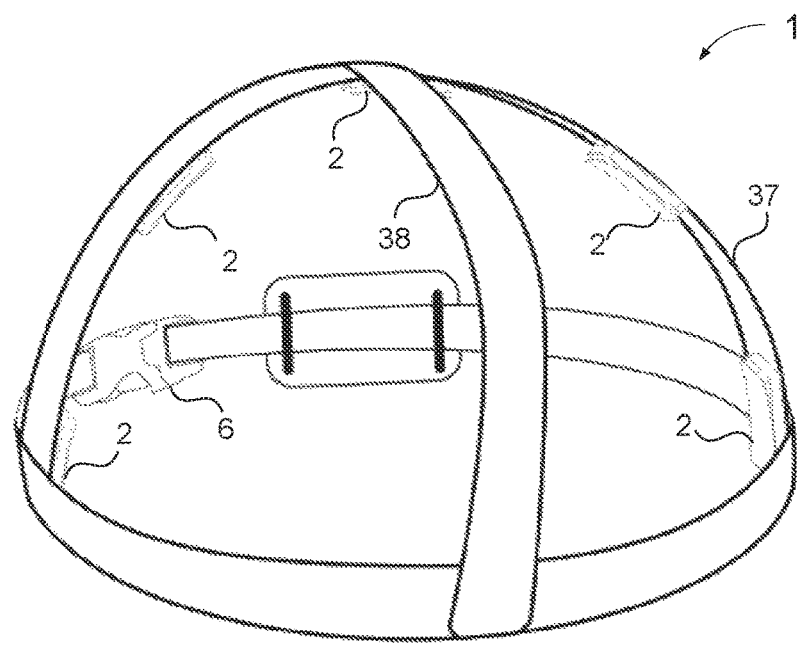
FIG. 3D illustrates a perspective view of an audible communication system for a dog, including five transducers mounted to a head harness.

FIGS. 2A and 2B illustrates another embodiment, in which the system includes four transducer assemblies 2 mounted to a head harness 27 on the dog. In the illustrated embodiment, the head harness 27 includes two flexible straps, connected to each other at two locations on either side of the dog's head. Further in this embodiment, the system includes two transducer assemblies 2 located (or adjustably locatable) behind the ears of the dog and two additional transducer assemblies 2, located (or adjustably locatable) near each temporomandibular joint of the dog. A peripheral unit 4 including a wireless receiver and power supply can be mounted on a separate collar 33, as shown and as in the embodiment of FIGS. 1A through 1D; or it may be mounted on the head harness 27.

FIGS. 3A through 3D illustrate another embodiment, in which the system includes five transducer assemblies 2 mounted to a head harness 37 on the dog. This embodiment is similar to that of FIGS. 2A and 2B, except that it includes an additional transducer assembly 2A located (or adjustably locatable) over the dog's occipital bone, and an additional (third) flexible strap 38 to hold the additional transducer assembly 2A in the desired position. It should be understood that other embodiments of the system can include more or fewer bone conduction transducers than the embodiments described herein.

Figure 4:
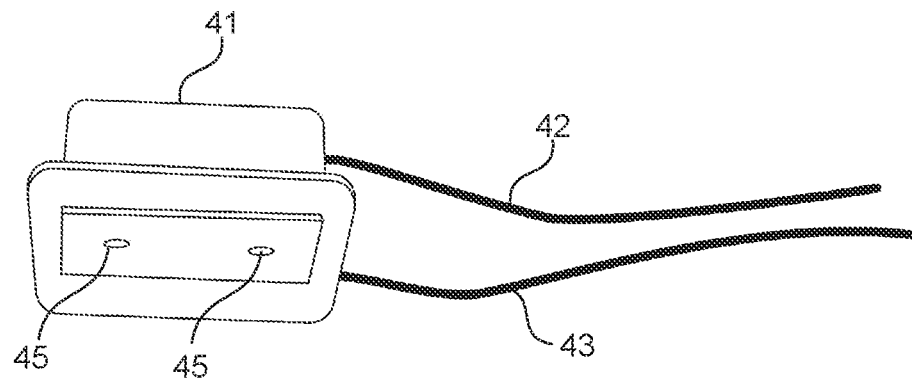
FIG. 4 illustrates an example of a bone conduction transducer that may be used in the embodiments described herein.

FIG. 4 illustrates an example of a bone conduction transducer 41 that may be used in the embodiments described herein. In at least some embodiments, the transducer 41 is a COTS bone conduction transducer, which has separate leads 42 and 43 for power and signal input, respectively. One example of a bone conduction transducer that may be suitable for this purpose is the BCE-1 transducer available from Dayton Audio of Springboro, Ohio.

Figure 5:
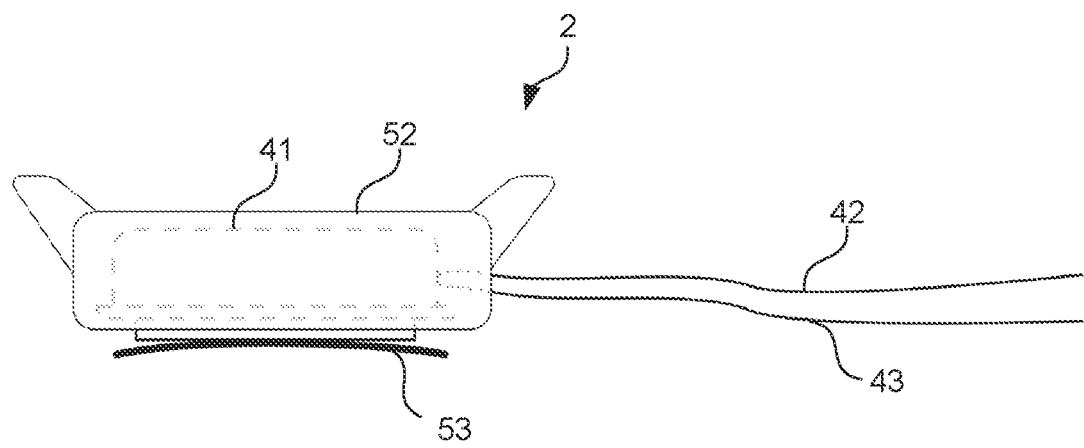
FIG. 5 is a side view of a transducer assembly.

FIG. 5 is a side view of a transducer assembly 2, showing how the transducer 41 can be mounted within a housing, which includes a first, carved-out portion 52 into which the transducer 41 is inserted, and a conduction plate (second portion) 53 that attaches to the transducer 41 by screws 74 (FIG. 7) that engage screw holes 45 in the transducer 41. In other embodiments, the transducer 41 may be fully enclosed within a housing, and in such cases, there may be at least one layer of material between the transducer 41 and the conduction plate 53. In any event, the conduction plate 53 is in mechanical contact (directly or indirectly) with the transducer 41. By "mechanical contact," what is meant here is that the conduction plate 53 is either in direct physical contact with the transducer 41, or there are one or more layers of material between the conduction plate 53 and the transducer 41 with direct physical contact between each pair of successive layers, i.e., no appreciable air gaps.

Both the first portion 52 of the housing and the conduction plate 53 can be made of acrylic or ceramic, and can be manufactured by 3D printing. The conduction plate 53 may be slightly concave, curved or otherwise shaped, to accommodate the particular target animal's morphology at the location where the conduction plate 53 is intended to be applied on the animal. The transducer 41 may be held within the first portion 52 by friction, adhesive (e.g., glue), or combination thereof.

Figure 6:
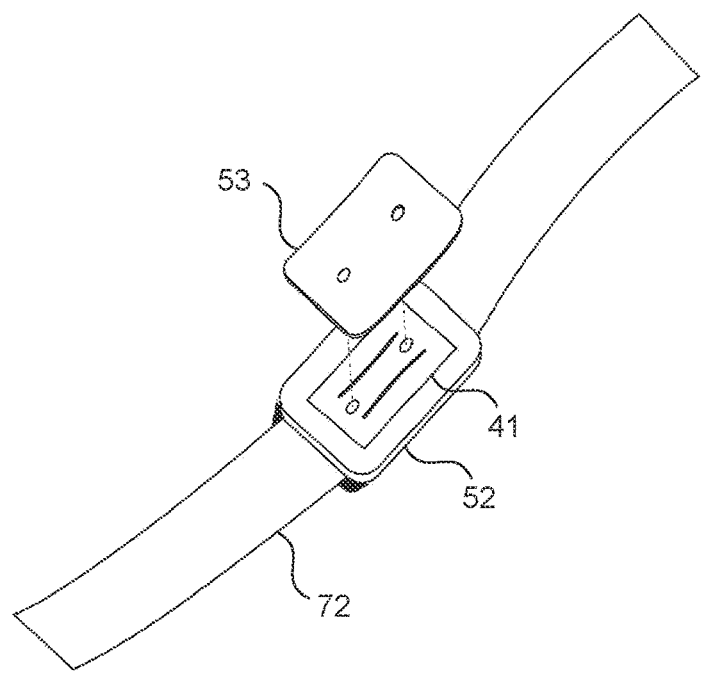
FIG. 6 is a perspective view of a transducer assembly mounted to a flexible strap.
Figure 7:
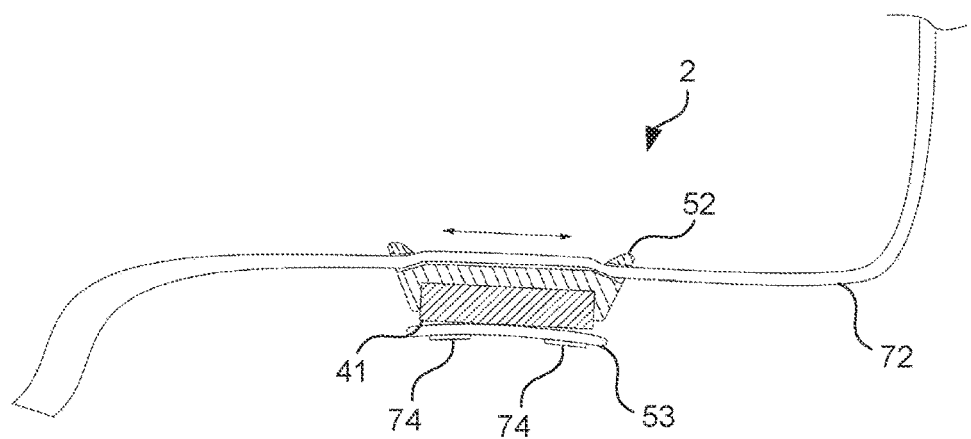
FIG. 7 is a side cross-sectional view of a transducer assembly mounted to a flexible strap.

FIG. 6 is a perspective view of a transducer assembly 2 mounted to a flexible strap 72 (i.e., part of a collar or head harness), illustrating how the conduction plate 53 can attach to the transducer 41. FIG. 7 is a side cross-sectional view of the transducer assembly 2 mounted to the flexible strap 72, showing how the transducer assembly 2 can be slidably positioned along the flexible strap 72. As shown, the flexible strap 72 may be threaded through slots on opposite sides of the housing yeah but don't stay on longer of the transducer assembly 2.

Figure 8:
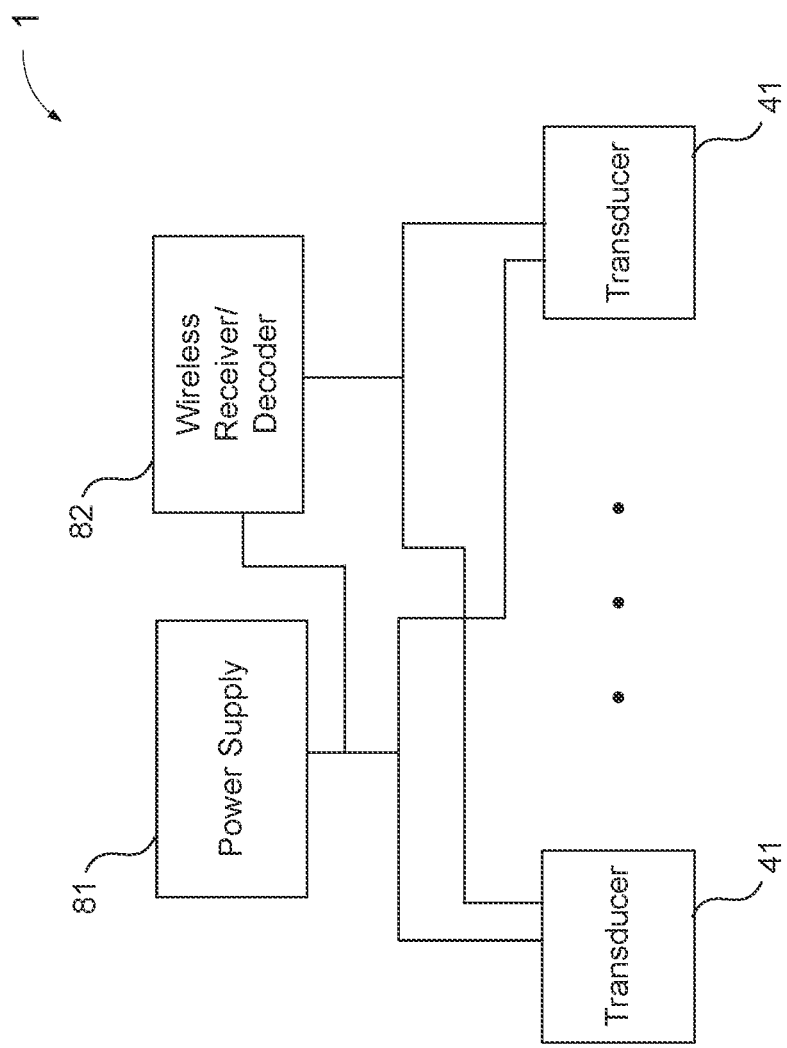
FIG. 8 is a block diagram illustrating the functional components of the system, according to at least some embodiments.

FIG. 8 is a block diagram illustrating the functional components of the system 1 introduced here, according to at least some embodiments. As shown, the system includes a number of bone conduction transducers 41, each of which is coupled to receive power from a power supply 81, and to receive a decoded audio signal from a wireless receiver/decoder 81. The illustration of the connections between these components in FIG. 8 is intended to be conceptual in nature and not limiting; hence, any known or convenient method of functionally connecting the above-mentioned components can used, such as direct point-to-point wired connections, one or more buses, bridges or adapters, one or more wireless links, etc.

EXAMPLES OF CERTAIN EMBODIMENTS

Certain embodiments of the technology introduced herein are summarized in the following numbered examples.

1. An apparatus for enabling audible communication between an animal and a remote handler of the animal, the apparatus comprising: a flexible strap configured to be worn by the animal; and a bone conduction transducer coupled to the flexible strap and capable of receiving a signal representing a message from the remote handler, the bone conduction transducer being configured to generate physical vibrations based on and representative of the signal representing the message from the remote handler, the bone conduction transducer being positioned or positionable on the flexible strap so that when the flexible strap is worn by the animal, the vibrations are conducted to a skeletal structure of the animal to enable the animal to audibly perceive the message from the remote handler.

2. The apparatus of example 1, further comprising a wireless receiver, coupled to the bone conduction transducer, to receive a wireless signal representing the message from the remote handler via a wireless communication link and, in response thereto, to provide the signal representing the message from the remote handler to the bone conduction transducer.

3. The apparatus of example 1 or example 2, wherein the flexible strap is at least a portion of a collar.

4. The apparatus of any of examples 1 through 3, wherein the flexible strap is at least a portion of a head harness.

5. The apparatus of any of examples 1 through 4, further comprising a conduction plate in mechanical contact with the bone conduction transducer and positioned so that, when the flexible strap is worn by the animal, the conduction plate is in mechanical contact with the animal and positioned between the animal and the transducer.

6. The apparatus of any of examples 1 through 5, further comprising a housing attached to the flexible strap, wherein the bone conduction transducer is contained within the housing.

7. The apparatus of any of examples 1 through 6, wherein the transducer is slidably coupled to the flexible strap so as to be repositionable along a length of the flexible strap.

8. The apparatus of any of examples 1 through 7, wherein the flexible strap at least partially includes a flexible conductor for providing power to each transducer of the at least one bone conduction transducer.

9. The apparatus of any of examples 1 through 8, wherein the flexible strap is composed at least partially of a material, and wherein the flexible conductor is woven into the material.

10. The apparatus of any of examples 1 through 9, further comprising a flexible electrical connector coupled to the bone conduction transducer and to the flexible conductor, wherein the flexible electrical connector is adjustable in length.

11. The apparatus of any of examples 1 through 10, wherein the flexible electrical connector has a helical configuration.

12. The apparatus of any of examples 1 through 11, wherein the wireless receiver is mounted on the flexible strap.

13. The apparatus of any of examples 1 through 12, wherein the bone conduction transducer is positioned or positionable on the flexible strap so as to be in contact with the animal directly on top of an occipital bone of the animal, when the flexible strap is worn by the animal.

14. The apparatus of any of examples 1 through 13, wherein the animal is a dog, and the flexible strap fits a physical morphology of the dog.

15. The apparatus of any of examples 1 through 14, the apparatus comprising a plurality of bone conduction transducers, each contained within a separate housing and slidably connected to the flexible strap.

16. An apparatus for enabling audible communication between an animal and a remote handler of the animal, the apparatus comprising: a flexible strap configured to be worn on the head of an animal; a wireless receiver to receive a wireless signal representing a message from the remote handler via a wireless communication link and, in response thereto, to provide a transformed signal representing the message from the remote handler; and a plurality of transducer assemblies slidably coupled to the flexible strap, each of the plurality of transducer assemblies including a bone conduction transducer to receive the transformed signal representing the message from the remote handler and to generate physical vibrations based on and representative of the signal representing the message from the remote handler; a conduction plate in mechanical contact with the bone conduction transducer and positioned so that, when the flexible strap is worn by the animal, the conduction plate is in mechanical contact with the animal and positioned between the animal and the corresponding bone conduction transducer to convey the physical vibrations from the bone conduction transducer to the animal; and a housing slidably coupled to the flexible strap and containing the bone conduction transducer.

17. The apparatus of example 16, wherein the flexible strap at least partially includes a flexible conductor for providing power to each bone conduction transducer.

18. The apparatus of example 16 or example 17, wherein the flexible strap is at least a portion of a collar.

19. The apparatus of any of examples 16 through 18, wherein the flexible strap is at least a portion of a head harness.

20. The apparatus of any of examples 16 through 19, wherein the flexible strap is composed at least partially of a material, and wherein a flexible conductor is woven into the material.

21. The apparatus of any of examples 16 through 20, further comprising a flexible electrical connector coupled to each bone conduction transducer and to the flexible conductor, wherein the flexible electrical connector is adjustable in length.

22. The apparatus of any of examples 16 through 21, wherein the flexible electrical connector has a helical configuration.

23. The apparatus of any of examples 16 through 22, wherein at least one of the transducer assemblies is positioned or positionable on the flexible strap so as to be in contact with the animal directly on top of an occipital bone of the animal, when the flexible strap is worn by the animal.

24. The apparatus of any of examples 16 through 23, wherein the animal is a dog, and the flexible strap fits a physical morphology of the dog.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An apparatus for enabling audible communication between an animal and a remote handler of the animal, the apparatus comprising:
a flexible strap configured to be worn by the animal; and
a bone conduction transducer coupled to the flexible strap and capable of receiving a signal representing a message from the remote handler, the bone conduction transducer being configured to generate physical vibrations based on and representative of the signal representing the message from the remote handler, the bone conduction transducer being positioned or positionable on the flexible strap so that when the flexible strap is worn by the animal, the vibrations are conducted to a skeletal structure of the animal to enable the animal to audibly perceive the message from the remote handler;
wherein the flexible strap at least partially includes an electrical conductor for providing power to the bone conduction transducer, wherein the electrical conductor is flexible so as to be adjustable in length.

2. The apparatus of claim 1, further comprising a wireless receiver, coupled to the bone conduction transducer, to receive a wireless signal representing the message from the remote handler via a wireless communication link and, in response thereto, to provide the signal representing the message from the remote handler to the bone conduction transducer.

3. The apparatus of claim 1, wherein the flexible strap is at least a portion of a collar.

4. The apparatus of claim 1, wherein the flexible strap is at least a portion of a head harness.

5. The apparatus of claim 1, further comprising a conduction plate in mechanical contact with the bone conduction transducer and positioned so that, when the flexible strap is worn by the animal, the conduction plate is in mechanical contact with the animal and positioned between the animal and the transducer.

6. The apparatus of claim 1, further comprising a housing attached to the flexible strap, wherein the bone conduction transducer is contained within the housing.

7. The apparatus of claim 1, wherein the transducer is slidably coupled to the flexible strap so as to be repositionable along a length of the flexible strap.

8. The apparatus of claim 1, wherein the flexible strap is composed at least partially of a material, and wherein the electrical conductor is woven into the material.

9. The apparatus of claim 1, wherein the electrical conductor has a helical configuration and is made flexible in length by having the helical configuration.

10. The apparatus of claim 2, wherein the wireless receiver is mounted on the flexible strap.

11. The apparatus of claim 1, wherein the bone conduction transducer is positioned or positionable on the flexible strap so as to be in contact with the animal directly on top of an occipital bone of the animal, when the flexible strap is worn by the animal.

12. The apparatus of claim 1, wherein the animal is a dog, and the flexible strap fits a physical morphology of the dog.

13. The apparatus of claim 1, the apparatus comprising a plurality of bone conduction transducers, each contained within a separate housing and slidably connected to the flexible strap.

14. An apparatus for enabling audible communication between an animal and a remote handler of the animal, the apparatus comprising:
a flexible strap configured to be worn on the head of an animal;
a wireless receiver to receive a wireless signal representing a message from the remote handler via a wireless communication link and, in response thereto, to provide a transformed signal representing the message from the remote handler; and
a plurality of transducer assemblies slidably coupled to the flexible strap, each of the plurality of transducer assemblies including
a bone conduction transducer to receive the transformed signal representing the message from the remote handler and to generate physical vibrations based on and representative of the signal representing the message from the remote handler;
a conduction plate in mechanical contact with the bone conduction transducer and positioned so that, when the flexible strap is worn by the animal, the conduction plate is in mechanical contact with the animal and positioned between the animal and the corresponding bone conduction transducer to convey the physical vibrations from the bone conduction transducer to the animal; and
a housing slidably coupled to the flexible strap and containing the bone conduction transducer;
an electrical conductor coupled to each bone conduction transducer for providing power to the bone conduction transducers, wherein the electrical conductor is flexible so as to be adjustable in length.

15. The apparatus of claim 14, wherein the flexible strap at least partially includes the electrical conductor.

16. The apparatus of claim 14, wherein the flexible strap is at least a portion of a collar.

17. The apparatus of claim 14, wherein the flexible strap is at least a portion of a head harness.

18. The apparatus of claim 14, wherein the flexible strap is composed at least partially of a material, and wherein the electrical conductor is woven into the material.

19. The apparatus of claim 14, wherein the conductor has a helical configuration and is made adjustable in length by the helical configuration.

20. The apparatus of claim 14, wherein at least one of the transducer assemblies is positioned or positionable on the flexible strap so as to be in contact with the animal directly on top of an occipital bone of the animal, when the flexible strap is worn by the animal.

21. The apparatus of claim 14, wherein the animal is a dog, and the flexible strap fits a physical morphology of the dog.

* * * * *